Jan. 3, 1961  C. BAUR ET AL  2,966,825
PHOTOGRAPHIC OBJECTIVE
Filed Feb. 27, 1957
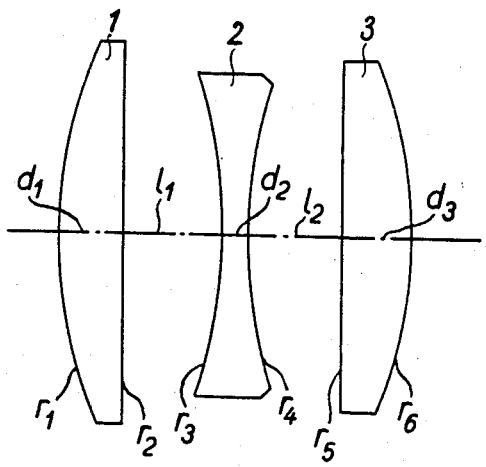
INVENTORS
Carl BAUR  Christian OTZEN
BY Michael J. Striker
agt.

United States Patent Office 2,966,825
Patented Jan. 3, 1961

2,966,825

PHOTOGRAPHIC OBJECTIVE

Carl Baur, Baldham, near Munich, and Christian Otzen, Munich, Germany, assignors to Agfa Aktiengesellschaft, Leverkusen, Germany Filed Feb. 27, 1957, Ser. No. 642,877

Claims priority, application Germany Mar. 24, 1956

2 Claims. (Cl. 88—57)

The present invention relates to a photographic objective having three lenses, and more particularly to a photographic objective having a positive front member, a negative middle member, and a positive rear member.

In accordance with the prior art, it has been attempted to improve the quality of objectives of this type by the use of lenses having a high power of refraction. In the known photographic objectives of this type, the positive front and rear members have the highest possible index of refraction, and the negative middle members have the lowest possible index of refraction in an attempt to obtain the largest possible picture area by flattening of the image field. The purpose of this constructive principle is to obtain a low Petzval sum.

However, in objectives of this type according to the known art, it is necessary, in view of the available glass, to select at least for one positive lens member a glass whose dispersive index $v$ is greater than 47 so as to simultaneously correct the color aberation and to maintain the index of refraction of the negative middle member significantly lower than the indices of refraction of the positive front and rear lenses. At the present state of the art, glass material available for large scale production of lenses and having a dispersive index greater than 47, has an index of refraction of approximately 1.720 for the D line of the spectrum. Since the negative middle member of the objective must have a very high power of refraction, the use of glass having a low index of refraction results in comparatively small radii of curvature of the negative middle member whereby the cost of manufacture is increased.

Moreover, in the known objective of the above described type having an aperture of 1:2.8, the sagital, and particularly the meridional image shell leave the image plane very soon at an angle of image on one side of approximately 23°, so that a greater angle of image can only be obtained by increasing the astigmatic zonal aberation.

A known objective of this type, to which the present invention is advantageously applied, has an angular field of about 43°. The positive front and rear members are made of glass having an index of refraction greater than 1.72 for the D line of the spectrum, and the axial air space between the negative middle member and the positive front member is greater than the axial air space between the negative middle member and the positive rear member.

It is one object of the present invention to overcome the disadvantages of the known photographic objectives of this type, and to provide a photographic objective capable of producing pictures of excellent quality but being less expensive to manufacture than the known objectives of this type.

It is another object of the present invention to provide a photographic objective in which coma, chromatic aberation, astigmatism, and distortion are corrected within a very great angle of field.

It is another object of the present invention to provide a photographic objective producing a sharply focussed and bright image in the corners of the picture and having an angular field of 52°.

It is another object of the present invention to provide a photographic objective in which spherical aberation is highly corrected.

A further object of the present invention is to provide in a photographic objective of the above described type, a negative middle member whose radii of curvature are greater than the corresponding radii of curvature in objectives of the same type according to the known art.

It is yet an object of the present invention to provide a photographic objective whose lenses have a comparatively small thickness.

Consequently, it is also an object of the present invention to provide an objective of the above described type which can be economically manufactured due to the fact that its lenses have great radii and consist of a comparatively small amount of glass.

With these objects in view, the present invention mainly consists in a photographic objective which comprises a positive front member, a positive rear member, and a negative middle member arranged intermediate the front and rear members axially spaced from the same, all lens members of the objective being made of glass having an index of refraction greater than 1.72 and smaller than 1.79 for the D line of the spectrum.

It has been found that the performance of objectives of the above described type according to the known art can be substantially improved, if, in contrast to the known constructions, the index of refraction of the negative middle member is greater than 1.72 for the D line of the spectrum. The resulting greater radii of curvature render the manufacture substantially less expensive, and obtain not only a flattening of the astigmatic picture shell, particularly of the meridional picture shell which is of particular importance for objectives whose front member is adjustable, but also result in excellent correction of the coma and of the sperical aberation. In contrast to the constructive principle of the known objectives of this type in which the positive members have a high index of refraction, and the negative middle member has a low index of refraction, in accordance with the present invention the differences between the indices of refraction of the positive front and rear members and the negative middle member are made as small as possible. Due to this new principle it becomes possible while using the available glass material, to provide positive members having very high indices of refraction. The comparatively small increase of the Petzval sum for about 0.010–0.030, as compared with the best Petzval sums that can be obtained in the known objectives, is insignificant if the extraordinary advantages obtained by the present invention are considered. Particularly, the substantial flattening of the astigmatic, comatic and spherical correction curves is of greatest importance.

In order to obtain very good correction of the comatic aberation, in accordance with the present invention the dispersive indices of the three lenses of the objective are so selected that the arithmetic mean of the dispersive indices of the three lenses is greater than 36 and less than 41.

An improvement of the geometric picture quality is obtained by making the radius of the rear face of the middle member smaller than the radius of the front face thereof. The difference between the radii of the middle member is preferably smaller than two tenths of the radius of the rear face of the negative middle member.

According to a preferred embodiment of the present invention, the sum of the axial air spaces of the objective is greater than 1.1 times the sum of the axial thicknesses of the three lenses, and smaller than 1.35 times the sum of the axial thicknesses of the three lenses.

The correction of the aberations is further improved if the radius of curvature of the front face of the front member, and the radius of curvature of the rear face of the negative middle member, are each greater than 1.25 times, and smaller than 1.5 times the total axial length of the objective.

The novel features which are considered as characteristic for the invention are set forth in particular in the appended claims. The invention itself, however, and additional objects and advantages thereof, will be best understood from the following description of specific embodiments when read in connection with the accompanying drawing showing a side view of an objective according to the present invention.

The photographic objective according to the present invention comprises a positive front member 1, a positive rear member 3, and a negative middle member 2. Front member 1 has a thickness $d_1$, a front face having a radius of curvature $r_1$ and a rear face having a radius of curvature $r_2$. The negative middle member 2 is spaced from the front member 1 an axial air space $l_1$, and is spaced from the rear member 3 an axial air space $l_2$. The air space $l_1$ is greater than the air space $l_2$. The front face of the middle member 2 has a radius of curvature $r_3$, and the rear face thereof has a radius of curvature $r_4$. The thickness of the middle member 2 is $d_2$.

The positive rear member 3 has a thickness $d_3$, a front face having a radius of curvature $r_5$, and the rear face having a radius of curvature $r_6$. The axial air space $l_1$ is greater than the axial air space $l_2$. In accordance with the present invention the index of refraction of the middle member $n_2$ is approximately the same as the index of refraction $n_1$ of the front member 1. In the preferred embodiment of the present invention the indices of refraction $n_1$, $n_2$ and $n_3$ are all greater than 1.72, smaller than 1.79 and preferably approximately 1.74 which may be mathematically expressed as follows:

$$1.72 < n_1 < 1.79$$
$$1.72 < n_2 < 1.79$$
$$1.72 < n_3 < 1.79$$

In order ot obtain a very good correction of the chromatic aberation, the arithmetic mean of the dispersive indices of the three members 1, 2, 3 is greater than 36 and less than 41, which may be mathematically expressed as follows:

(1) $$36 < \frac{v_1 + v_2 + v_3}{3} < 41$$

For improving the geometric picture quality, the radius $r_4$ is smaller than the radius $r_3$ and the difference between the radii $r_3$ and $r_4$ is less than 0.2 $r_4$ which may be mathematically expressed as follows:

(2) $$(r_3 - r_4) < 0.2 r_4$$

The sum of the axial air spaces $l_1$ and $l_2$ is greater than 1.1 times the sum of the axial thicknesses $d_1$, $d_2$ and $d_3$, and smaller than 1.35 times the sum of the axial thicknesses $d_1$, $d_2$, and $d_3$, which may be mathematically expressed as follows:

(3) $$1.1 < \frac{l_1 + l_2}{d_1 + d_2 + d_3} < 1.35$$

In the preferred embodiment of the present invention, the radius of curvature $r_1$ and the radius of curvature $r_4$ are greater than 1.25 times, and smaller than 1.5 times the total axial length of the objective, which may be mathematically expressed as follows:

(4) $$1.25 < \frac{r_1}{l_1 + l_2 + d_1 + d_2 + d_3} < 1.50$$

(5) $$1.25 < \frac{r_4}{l_1 + l_2 + d_1 + d_2 + d_3} < 1.50$$

The following two examples are illustrative for objectives according to the present invention. The examples are based on a focal length $f = 1.000$ and on a relative aperture of 1:2.8. The angle of field is 52°.

Example 1

| Lens Elements | Radii | Thicknesses | $n_D$ | $v$ |
|---|---|---|---|---|
| 1 | $r_1 = +0.47350$ | $d_1 = 0.06372$ | $n_1 = 1.74400$ | $v_1 = 44.9$ |
| | $r_2 = +14.88351$ | $l_1 = 0.10015$ | | |
| 2 | $r_3 = -0.58459$ | $d_2 = 0.02705$ | $n_2 = 1.74000$ | $v_2 = 28.2$ |
| | $r_4 = +0.51414$ | $l_2 = 0.09253$ | | |
| 3 | $r_5 = +3.31041$ | $d_3 = 0.06979$ | $n_3 = 1.74400$ | $v_3 = 44.9$ |
| | $r_6 = -0.44969$ | | | |

Example 2

| Lens Elements | Radii | Thicknesses | $n_D$ | $v$ |
|---|---|---|---|---|
| 1 | $r_1 = +0.46314$ | $d_1 = 0.06233$ | $n_1 = 1.74400$ | $v_1 = 44.9$ |
| | $r_2 = +14.55789$ | $l_1 = 0.11174$ | | |
| 2 | $r_3 = -0.57180$ | $d_2 = 0.01494$ | $n_2 = 1.74077$ | $v_2 = 27.7$ |
| | $r_4 = +0.50289$ | $l_2 = 0.09388$ | | |
| 3 | $r_5 = +3.23799$ | $d_3 = 0.08630$ | $n_3 = 1.74400$ | $v_3 = 44.9$ |
| | $r_6 = -0.45193$ | | | |

It will be appreciated that all lens faces of the objective according to the present invention have comparatively great radii of curvature. Particularly, the radii of curvature of the negative middle member are greater than the corresponding radii of the known objectives of the same type. Also, the sum of the thicknesses $d_1$, $d_2$, and $d_3$ is smaller than have been possible in the objectives according to the prior art. The great radii, and the small quantities of glass required in the objective according to the present invention make possible the inexpensive manufacture of an objective which is superior to the known objectives of the same type.

It will be understood that each of the elements described above, or two or more together, may also find a useful application in other types of photographic objectives differing from the types described above.

While the invention has been illustrated and described as embodied in a photographic objective comprising three lenses having indices of refraction greater than 1.72, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A photographic objective constructed substantially according to the specifications in the following table:

| Lens Elements | Radii | Thicknesses | $n_D$ | $v$ |
|---|---|---|---|---|
| 1 | $r_1=+0.47350\ f$ | $d_1=0.06372\ f$ | $n_1=1.74400$ | $v_1=44.9$ |
|  | $r_2=+14.88351\ f$ | $l_1=0.10015\ f$ |  |  |
| 2 | $r_3=-0.58459\ f$ | $d_2=0.02705\ f$ | $n_2=1.74000$ | $v_2=28.2$ |
|  | $r_4=+0.51414\ f$ | $l_2=0.09253\ f$ |  |  |
| 3 | $r_5=+3.31041\ f$ | $d_3=0.06979\ f$ | $n_3=1.74400$ | $v_3=44.9$ |
|  | $r_6=-0.44969\ f$ |  |  |  | wherein the first column lists three lens members in numerals in order from front to rear; wherein the relative aperture is 1:2.8; wherein the angular field of the objective is 52°; wherein $f$ is the focal length of the objective, $n_D$ is the index of refraction for the D line of the spectrum, and $v$ is the dispersive index; and wherein $r$, $d$ and $l$ refer, respectively, to the radii of curvature of the refractive surfaces, the axial thicknesses of the lens members, and the axial air spaces between the lens members, the subscripts on the characters $r$, $d$ and $l$ being numbered consecutively from the front to the rear, and the plus and minus signs in the second column corresponding to refractive surfaces which are respectively convex and concave to the front.

2. A photographic objective constructed substantially according to the specifications in the following table:

| Lens Elements | Radii | Thicknesses | $n_D$ | $v$ |
|---|---|---|---|---|
| 1 | $r_1=+0.46314\ f$ | $d_1=0.06233\ f$ | $n_1=1.74400$ | $v_1=44.9$ |
|  | $r_2=+14.55789\ f$ | $l_1=0.11174\ f$ |  |  |
| 2 | $r_3=-0.57180\ f$ | $d_2=0.01494\ f$ | $n_2=1.74077$ | $v_2=27.7$ |
|  | $r_4=+0.50289\ f$ | $l_2=0.09388\ f$ |  |  |
| 3 | $r_5=+3.23799\ f$ | $d_3=0.08630\ f$ | $n_3=1.74400$ | $v_3=44.9$ |
|  | $r_6=-0.45193\ f$ |  |  |  | wherein the first column lists three lens members in numerals in order front to rear; wherein the relative aperture is 1:2.8; wherein the angular field of the objective is 52°; wherein $f$ is the focal length of the objective, $n_D$ is the index of refraction for the D line of the spectrum, and $v$ is the dispersive index; and wherein $r$, $d$ and $l$ refer, respectively, to the radii of curvature of the refractive surfaces, the axial thicknesses of the lens members, and the axial air spaces between the lens members, the subscripts on the characters $r$, $d$, and $l$ being numbered consecutively from the front to the rear, and the plus and minus signs in the second column corresponding to refractive surfaces which are respectively convex and concave to the front.

References Cited in the file of this patent

UNITED STATES PATENTS

| 1,987,878 | Tronnier | Jan. 15, 1935 |
| 2,270,234 | Warmisham | Jan. 20, 1942 |
| 2,279,372 | Herzberger | Apr. 14, 1942 |
| 2,298,090 | Warmisham | Oct. 6, 1942 |
| 2,391,114 | Aklin | Dec. 18, 1945 |
| 2,731,884 | Brendel | Jan. 24, 1956 |
| 2,818,777 | Hudson et al. | Jan. 7, 1958 |

FOREIGN PATENTS

| 532,950 | Great Britain | Feb. 4, 1941 |
| 612,757 | Great Britain | Nov. 17, 1948 |